United States Patent
Schumaker et al.

(10) Patent No.: US 9,266,547 B2
(45) Date of Patent: Feb. 23, 2016

(54) MULTI-TIER UTILITY CART

(71) Applicant: Metro Industries Inc., Reno, NV (US)

(72) Inventors: Kyle Schumaker, Plains, PA (US); Wilhelm Heinrich, White Haven, PA (US); Robert Kaluzavich, Kingston, PA (US)

(73) Assignee: Metro Industries Inc., Reno, NV (US)

( * ) Notice: Subject to any disclaimer, the term of this patent is extended or adjusted under 35 U.S.C. 154(b) by 234 days.

(21) Appl. No.: 13/834,279

(22) Filed: Mar. 15, 2013

(65) Prior Publication Data

US 2014/0217690 A1    Aug. 7, 2014

Related U.S. Application Data

(60) Provisional application No. 61/760,435, filed on Feb. 4, 2013.

(51) Int. Cl.
| | |
|---|---|
| *B62B 5/00* | (2006.01) |
| *B62B 3/00* | (2006.01) |
| B62B 3/02 | (2006.01) |
| A47B 57/54 | (2006.01) |
| A47B 31/00 | (2006.01) |
| A47B 57/26 | (2006.01) |

(Continued)

(52) U.S. Cl.
CPC .............. *B62B 3/005* (2013.01); *A47B 31/00* (2013.01); *B62B 5/00* (2013.01); *A47B 23/001* (2013.01); *A47B 47/0083* (2013.01); *A47B 47/024* (2013.01); *A47B 55/02* (2013.01); *A47B 57/26* (2013.01); *A47B 57/265* (2013.01); *A47B 57/34* (2013.01); *A47B 57/40* (2013.01); *A47B 57/54* (2013.01); *A47B 57/545* (2013.01); *A47B 87/0223* (2013.01); *A47B 2031/002* (2013.01);

(Continued)

(58) Field of Classification Search
CPC ........ B62B 3/00; B62B 3/02; B62B 2205/33; B62B 3/022; A47B 57/265; A47B 31/00; A47B 2031/004; A47B 57/26; A47B 57/545; A47B 87/0223; A47B 2031/002; A47B 2031/005; A47B 2230/15; A47B 23/001; A47B 47/0083; A47B 47/024; A47B 55/02; A47B 57/34; A47B 57/40; A47B 57/54
See application file for complete search history.

(56) References Cited

U.S. PATENT DOCUMENTS 4,754,712 A * 7/1988 Olson et al. .................. 108/107
4,763,799 A * 8/1988 Cohn et al. .................... 211/187

(Continued)

OTHER PUBLICATIONS

International Search Report and Written Opinion in International Application No. PCT/US2014/014721 dated May 19, 2014.

*Primary Examiner* — Brodie Follman
*Assistant Examiner* — Hilary L Johns
(74) *Attorney, Agent, or Firm* — Fitzpatrick, Cella, Harper & Scinto

(57) ABSTRACT

A utility cart has four corner posts arranged in rectangular pattern and at least one lower shelf including a recess in the push side edge and a top shelf that, instead of the recess, includes a handle. The other three sides of each of the shelves are substantially the same size and extend beyond the corner posts. The bottom of each of the shelves may include a wagon wheel structure in each corner which secures and supports the corner posts of the cart.

17 Claims, 7 Drawing Sheets

(51) Int. Cl.
- *A47B 87/02* (2006.01)
- *A47B 47/02* (2006.01)
- *A47B 47/00* (2006.01)
- *A47B 23/00* (2006.01)
- *A47B 57/40* (2006.01)
- *A47B 55/02* (2006.01)
- *A47B 57/34* (2006.01)

(52) U.S. Cl.
CPC ..... *A47B 2031/003* (2013.01); *A47B 2031/004* (2013.01); *A47B 2031/005* (2013.01); *A47B 2230/15* (2013.01); *B62B 3/00* (2013.01); *B62B 3/02* (2013.01); *B62B 3/022* (2013.01); *B62B 2205/33* (2013.01); *B62B 2501/065* (2013.01)

(56) References Cited

U.S. PATENT DOCUMENTS

| | | | | |
|---|---|---|---|---|
| 4,852,501 A | * | 8/1989 | Olson et al. | 108/107 |
| 4,998,023 A | * | 3/1991 | Kitts | 280/47.35 |
| 5,011,240 A | * | 4/1991 | Kelley et al. | 312/249.12 |
| 5,205,630 A | * | 4/1993 | Welch et al. | 312/249.11 |
| 5,257,794 A | * | 11/1993 | Nakamura | 280/79.3 |
| 5,797,503 A | * | 8/1998 | Stevens et al. | 211/187 |
| 2003/0146180 A1 | * | 8/2003 | Craft | 211/188 |
| 2005/0280228 A1 | * | 12/2005 | Fernandes et al. | 280/47.35 |
| 2008/0018078 A1 | * | 1/2008 | Van Landingham et al. | 280/651 |

* cited by examiner ic features.

MULTI-TIER UTILITY CART

BACKGROUND OF THE INVENTION

1. Field of the Invention

The present invention relates to a storage cart with ergonomic shelving units. Further, the present invention relates to a novel design of such shelving units that enables use of single mold despite different shelving designs and functions.

2. Related Art

Hospitals, restaurants, and other businesses use utility/bussing carts regularly to transport items between locations. These reliable carts can be used as mobile prep and/or work stations and are often designed to maximize surface area in order to maximize capacity. To this end, the surface area of cart shelves is being extended to the edges of cart posts, and beyond. Examples of such carts are disclosed in U.S. Pat. Nos. 4,595,107 and 4,763,799, assigned to Metro Industries, Inc. The surface area extension, however, can adversely affect the gait of a person pushing such a cart. Specifically, the farther out the edges extend, the more likely the legs of a person pushing the cart are to bump the cart shelves. Furthermore, the farther out the shelves extend, the more plastic is required to mold the shelves, because of both the surface area of the shelves and corresponding support structure on the bottom of the shelf.

Accordingly, there is a need in the art for a utility cart that is ergonomically friendly to walking and that economically uses materials. Such a utility cart will allow a user's legs to swing more freely in the direction of the cart without obstruction, as well as reduce costs.

BRIEF DESCRIPTION

The present invention provides a multi-tier utility cart with improved ergonomic features.

Further features and advantages of the present invention will become more apparent from the detailed description set forth below when taken in conjunction with the following drawings.

It is an object of the present invention to provide an ergonomic utility cart that has the advantages over conventional carts of a similar kind. The cart of the present invention preferably is intended to have improved ergonomics, allowing the user to walk comfortably behind the cart without obstructing the user's feet, ankles, or knees during use, thanks to an ergonomic handle and a shelf cut-away. The improved cart also preferably provides temporary storage with a modern, sleek aesthetic. It is a further object of the present invention to provide these advantages in a utility cart which nevertheless exhibits structural rigidity, preferably in all directions.

In a preferred embodiment, the present invention provides an ergonomic utility cart that utilizes improved shelf structures with an ergonomic recess on a trailing edge of a shelf. The cart may have one or multiple lower shelves which are located below a top shelf, preferably with an integrated handle. The lower shelves and a top shelf may be mounted on four supporting posts which are connected to casters (wheels) or other mechanisms that provide mobility.

The ergonomic modular utility cart in accordance with a preferred embodiment of present invention comprises a plurality of corner support posts, preferably four, that may be adapted from the InterMetro Industries SUPER ERECTA shelf system. Each of the corner supports posts may be orientated substantially parallel (i.e., within 5°) to each of the other corner support posts. The cart further includes at least one lower shelf and a top shelf. Each shelf may be substantially perpendicular to each of the corner support posts and substantially parallel to each of the other shelves. Each shelf preferably has shallow depression on a top surface thereof for receiving articles to be transported. A lip of the depression may act as a stop to prevent items from sliding off of the shelf during transport, particularly during turns.

A lower shelf, which may be a middle or bottom shelf, is mountable on the corner support posts and is preferably formed with open post receiving portions. The open post receiving portions each encircle (at least partially) a corresponding post to secure the lower shelf to the posts. The top shelf preferably is mountable in the region of the tops of the corner support posts and is formed with a plurality of closed post receiving portions. Each post receiving portion preferably has a cross-section substantially congruent to the cross-section of a corner post. Each of the open and closed post receiving portions is preferably formed with a wagon wheel support structure, as discussed further below.

Each shelf is preferably substantially rectangular in shape, having a leading edge (referring to the lead edge of the cart when it is pushed from behind by, for instance, a handle), a trailing edge (i.e., the edge of the pushing side preferably including a handle), and side edges extending between the leading and trailing edges. The lower shelves, or intermediate shelves, may have a leading edge and side edges that extend exterior to a line (and/or plane) extending between corresponding exterior edges, or center axes, of the four corner posts. The trailing edge, however, preferably has a recess, the inner wall of which extends interior to a line (and/or plane) extending between the center axes of the rear corner posts. More preferably, the inner wall of the recess, or at least a portion of the inner wall of the recess, extends interior to a line (and/or plane) extending between the most interior edges of the rear corner posts.

The cart may include at least one lower shelf located near the bottom of the corner support posts, just above the casters. The cart may also include another lower shelf, secured at a fixed or adjustable position along the posts between a top shelf and a bottom shelf, which may also include the recess. The recess lessens impediments to legs and other lower body parts when the user is walking behind the cart. The recess is preferably only provided on the push side edge of each lower shelf, in order to maximize the surface area on the other sides of the shelf.

The upper shelf, or top shelf, preferably does not include a recess, inasmuch as its outer dimension on its trailing edge may extend from the cart beyond the outer dimensions of the rear posts. The top shelf is preferably positioned high enough above the ground as to avoid contact with a typical user's legs. In particular, the top surface of the top shelf may be positioned at a height in a range of 30 to 36 inches, or more preferably, in a range of 32 to 34 inches. In a preferred embodiment, the top shelf includes a handle which, in a more preferred embodiment, may extend above the height of the top surface of the top shelf to provide a hand hold for pushing the cart. The handle may also extend behind the rearmost edge (e.g., trailing edge) of the other shelves, in order to provide additional clearance for a typical user's legs relative to the recesses.

The top shelf may further include a utility tray, which may be formed as a depression below the top shelf surface. The utility tray is preferably defined by elongated leading and trailing walls, with shorter sidewalls connecting those leading and trailing walls. More preferably, the leading wall of the utility tray corresponds to the in size and relative position to the trailing edge of each lower shelf. Thus, a top shelf and a lower shelf may be created from a single mold, with a removable portion that alters the rear of the shelf structure in order to change the type of shelf being created. The part of the mold that forms the leading edge of the utility tray preferably is the same part that forms the trailing edge of the lower shelf defining the recess. Consequently, the utility tray and recess occupy the same relative positions.

As both shelves may be made from the same mold, the upper surface of the top shelf still has same surface area as the lower shelves with an additional storage area defined by the utility tray. The features and dimensions of the sides and the leading edge of the top shelf, including the width and length of the shelf surface are also preferably the same as that of the lower shelf.

The utility tray, which is a recess in the upper surface of the top shelf, provides organization space for holding tools or personal items. The utility tray is preferably in a range of about 1.5 to about 3.5 inches wide, most preferably in a range of about 1.75 to about 2.25 inches wide, and in a range of about 12 to about 23 inches long (these dimensions may also define the recess in the trailing edge of the lower shelves). Of course, the exact width of the utility tray may vary along the length of the utility tray. For example, the width of the utility tray may be tapered to be narrower, in a horizontal direction, at the side walls (near each of the rear corner posts of the cart) and be widest at the center of the utility tray, in order to provide for taper locks. That is, the trailing wall of the utility tray may belly out away from a line between the cart posts. The width of the utility tray may be adapted to receive a mobile phone.

The utility tray may also taper towards bottom, in vertical direction, in order to allow for a taper lock on cups and the like placed in the utility tray. In particular, the leading and trailing walls of the utility tray may be closer at the bottom of the utility tray than at the top.

In a preferred embodiment, the top shelf's handle arches upward in an ergonomic manner. Specifically, the handle is preferably attached to the top shelf proximate to opposing side edges of the cart, and rises upward from the points of attachment toward the center of the handle which is preferably aligned with the center of the top shelf (between the side edges). The height at the peak of the handle is preferably in a range of about 1.5 to about 3.5 inches above the top surface for carrying articles on the top shelf, and most preferably in a range of about 2 to about 2.5 inches above the top surface of the top shelf. The total height at the peak of the handle is preferably in a range of about 32 to about 38 inches from the ground (i.e., bottom of casters), and most preferably in a range of about 34 to about 37 inches above the ground.

The handle is arched to allow for multiple hand positions, including a flatter hand position, relative to a horizontal axis, in the center of the handle and a more angular hand position proximate to the side edges of the cart, which are attached to the edges of the handle. The outermost handle positions may preferably attach to the top shelf spaced away from the center. The handle is arched from a center handle peak vertically downward towards the top surface of the cart. The handle is also arched from a handle position behind the trailing edge of the cart surface towards the body of the cart.

The top shelf may include a handle support structure extending between the handle and the utility tray to provide additional stability to the handle. The support structure may include an opening (preferably vertically aligned) which may be configured to cradle and/or support a tool, device, or implement associated with the intended use of the cart. For instance, the handle support structure may be configured to receive an infrared scanner. The support structure extending between the handle and the utility tray may have a substantially U-shaped cross-section. In a preferred embodiment, the support structure's U-shaped cross-section opens upward. With this design, the support structure may define additional storage space. In a more preferable embodiment, the upward facing U-shaped support structure is open to (i.e., in fluid communication with) the utility tray.

Another preferred feature of the cart is a wagon wheel structure on the underside of each shelf to help secure the corner posts in place. The wagon wheel structure preferably includes a plurality of at least partially concentric cylindrical projections and a plurality of ribs which extend radially there between. An interior cylindrical projection defines a hole for receiving a corner post. An exterior cylindrical projection may be at least partially concentric with the interior cylindrical projection. The exterior cylindrical projection may form the exterior edge of the portion of the shelf where the exterior cylindrical projection is located. A plurality of raised ribs, which are preferably linear projections from the bottom surface for the shelf, extend between (and/or connect) the interior cylindrical projection and the exterior cylindrical projection, preferably at predetermined intervals. In between these cylindrical projection and radial ribs, the wagon wheel structure defines a plurality of trapezoidal recesses, and other quadrilateral recesses, each with smaller edge closer to the hole for corner post. Each of the trapezoidal recesses may have rounded corners, and some of the rounded quadrilaterals corners near certain edges of the cart will create five-sided polygons. These recesses help distribute loads transferred from the corner posts to the shelves radially in each direction.

The underside of the shelves may include a plurality of ribs to provide structural support for the top surface of the shelves. The plurality of ribs may be orientated perpendicular to the edges of the cart and diagonally between the corners of the cart. The ribs may extend out from a plurality of concentric cylindrical projections located in the center of the shelf surface. Like the ribs, the concentric circles provide structural support for the top surface of the shelves. The underside of the shelves may also include attachment points, including cross-shaped projections for attaching optional equipment to the utility carts.

The shelves may be made using a gas-assist manufacturing process utilizing a low-pressure process utilizing gas to apply uniform pressure throughout the plastic part mold. Each shelf is preferably made of one piece of molded plastic. The underside structure of each shelf is preferably the same. Both the top shelf and lower shelves may be manufactured using primarily the same mold. A removable handle mold portion may be added to the main mold body to manufacture a top shelf with the utility tray and handle. When the removable handle mold portion is removed from the main mold body, the mold may be used to create a lower shelf with a recess.

The molds are preferably constructed such that the portion of the mold defining the handle and utility tray are removable. The handle and utility tray mold portion, defining a top shelf, may be removed from the main mold portion, which defines the top and bottom surfaces that are common to both top and lower shelves.

When a top shelf, with the handle and utility tray, is being molded, a set of four core pins may be installed in the mold such that post holes for receiving the corner posts will not extend fully through to the top side of the shelf. As such, a stop point is created for the corner posts in the top shelf. Another set of core pins, which extend fully across the mold, may be used when creating a lower shelf so that through holes are created for the corner posts. This task may also be accomplished by withdrawing a single set of core pins to a predetermined depth, depending on the shelf to be molded. When a lower shelf, without the handle and tray, is being molded, the handle mold insert will be removed and replaced with an insert that does not define the handle and tray.

In accordance with a preferred embodiment, a cart includes a plurality of posts (which are preferably circular in cross-section, but may have alternative shapes) supporting a plurality of shelves that extend substantially perpendicular thereto, a plurality of casters supporting the cart, an upper shelf (of plurality of shelves), and a lower shelf (of plurality of shelves). There are preferably four corner posts. The upper shelf is supported by the posts and comprises four edges, including two side edges, a leading edge and a trailing edge, each of which is positioned external to a line (and/or plane) extending between center axes of a corresponding pair of the posts. The lower shelf is supported by the posts and comprises four edges, including two side edges, a leading edge, and a trailing edge. Each of the side edges and the leading edge of the lower shelf is positioned external to a line (and/or plane) extending between the center axes of a corresponding pair of the posts. The trailing edge defines a recess positioned internal to a line (and/or plane) extending between center axes of a corresponding pair of the posts.

A portion of the trailing edge defining the recess may extend interior to a line (and/or plane) extending between internal edges of the corresponding pair of the posts. The upper shelf may further include handle on the trailing edge. The handle may extend along substantially the entire length of the trailing edge. A tray may be formed as a depression in the upper surface of the upper shelf. The tray may be defined by side walls including a trailing side wall positioned farthest from a center of the tray and a leading side wall positioned nearest to the center of the tray. The leading side wall may be positioned internal to the line (and/or plane) extending between the center axes (or interior dimensions) of the pair of the posts corresponding to the recess. The leading side wall of the tray may be vertically aligned with the trailing edge of the lower shelf defining the recess.

A caster of the plurality of casters may be positioned at the bottom of each of the corner posts. The casters may be fixed or rotatable casters. Each of the upper and the lower shelves may have a lip edge, defining a depressed section in the top surface of each of the shelves as a storage surface, extending around the perimeter of the top surface of each shelf.

The lower shelf may have open post receiving portions, which are preferably each substantially cylindrical in shape with openings at both sides of the substantial cylindrical shape, for securing the lower shelf to corresponding posts. The upper shelf may have closed post receiving portions, which are preferably each substantially cylindrical in shape, with a closed top surface for receiving and stopping a corresponding post. Each of the upper shelf and the lower shelf may further include a wagon wheel post support structure, as discussed below, surrounding each of the posts. The wagon wheel post support structure may be located proximate to the corners of the cart shelves and/or may be integral to the edges of the shelves.

In accordance with another preferred embodiment, a mobile cart may include a plurality of posts (preferably four) extending through and supporting a plurality of shelves, each of the plurality of shelves extending substantially perpendicular to the center axes of the posts. The cart may also include a plurality of casters supporting the cart, an upper shelf (of the plurality of shelves), and a lower shelf (of the plurality of shelves). The upper shelf is supported by the posts and comprises four edges, including two side edges, a leading edge and a trailing edge, wherein a concave tray may be formed in a top surface of the upper shelf. The tray is defined by a plurality of walls including a leading wall positioned on a side of the tray closest to the center of the upper shelf. The lower shelf supported by the posts and comprising four edges, including two side edges, a leading edge, and a trailing edge. Each of the side edges and the leading edge of the lower shelf is positioned external to a line (and/or plane) extending between the center axes of a corresponding pair of the posts. The trailing edge may define a recess positioned internal to a line (and/or plane) extending between center axes (or interior dimensions/edges) of a corresponding pair of the posts. In directions perpendicular to the posts, the trailing edge defining the recess and the leading wall of the tray are in the same relative positions. In other words, they are preferably vertically aligned.

The upper shelf may further include a handle on the trailing edge of the cart that extends along substantially the entire length of the trailing edge. The tray may be defined by side walls including the leading side wall positioned closest to the center of the tray and a trailing side wall positioned farthest from a center of the tray. The trailing side wall may be positioned external to a line (and/or plane) extending between center axes (or outer dimensions/edges) of a pair of the posts positioned proximate the trailing edge of the upper shelf. The leading side wall may be positioned internal to a line (and/or plane) extending between the center axes (or inner dimensions/edges) of the pair of the posts positioned proximate to the trailing edge of the upper shelf.

The leading side wall of the tray may be vertically aligned with the recess of the trailing edge of the lower shelf. The lower shelf may have open post receiving portions, which are preferably each substantially cylindrical in shape with openings at both sides of the each substantial cylindrical shape, for securing the lower shelf to corresponding posts. The upper shelf may have closed post receiving portions, which are preferably each substantially cylindrical in shape, with a closed top surface for receiving and stopping a corresponding post. Each of the upper shelf and the lower shelf may further include a wagon wheel post support structure, as discussed below, surrounding each of the posts.

In accordance with yet another preferred embodiment, a post support structure extending below a shelf surface to receive a post may include a substantially cylindrical interior protrusion extending from a bottom of the shelf surface, the interior of which defines a hole for receiving a post. Further, an exterior protrusion extends from the bottom of the shelf surface which is at least partially concentric with the interior protrusion and surrounds the interior protrusion. A plurality of radial ribs, which are formed on the bottom of the shelf surface, extend radially out from the interior protrusion and connect the interior protrusion and the exterior protrusion. The radial ribs may rigidly connect the interior protrusion and the exterior protrusion. Preferably, the interior protrusion, the exterior protrusion and the plurality of radial ribs are made of one piece of molded plastic. In a more preferable embodiment, the interior protrusion, the exterior protrusion and the plurality of radial ribs are integral with the rest of the shelf, such that the shelf surface and shelf edges are all made of one piece of molded plastic.

The plurality of radial ribs may extend from the interior protrusion to the exterior protrusion at defined intervals. The post support structure may define a plurality of trapezoidal recesses with a small edge defined by the interior protrusion, a long edge defined by the exterior protrusion, and sides defined two of the plurality of radial ribs. The interior protrusion, exterior protrusion, and radial ribs may be formed of a single piece of molded plastic.

The foregoing and other objects and advantages of the present invention may be more clearly understood from consideration of the following detailed description of the preferred embodiments taken in conjunction with the accompanying drawing.

BRIEF DESCRIPTION OF THE DRAWINGS

The features and advantages of the present invention will become more apparent from the detailed description set forth below when taken in conjunction with the following drawings.

DETAILED DESCRIPTION

The example embodiments of the invention presented herein are directed to an ergonomic multi-tier utility cart. This is for convenience, and is not intended to limit the application of the present invention. In fact, after reading the following description, it will be apparent to one skilled in the relevant art how to implement the following invention in alternative embodiments, involving, for example, mobile storage cabinets and single-tier utility carts.

Figure 1:
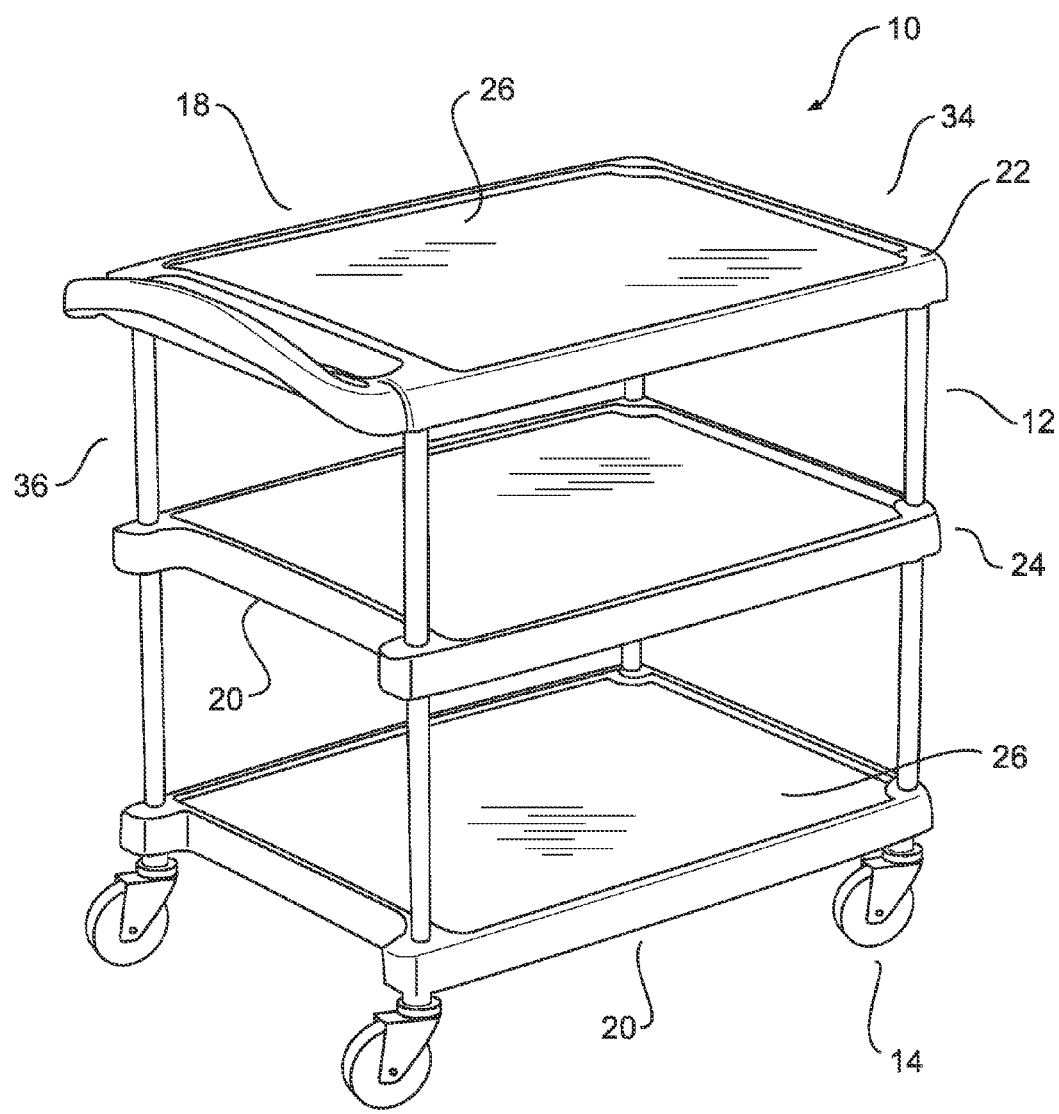
FIG. 1 is a perspective view of a rear of an ergonomic utility cart according to one embodiment of the present invention.

FIG. 1 shows a preferred embodiment of the present invention. Specifically, the ergonomic utility cart 10 in accordance with that embodiment includes four posts or columns 12. Each post 12 has a caster 14 mounted at its bottom. Each caster 14 may swivel about a vertical aligned axis. The cart further includes a top shelf 18 and at least one lower shelf 20, both of which have top surfaces 26 for carrying articles.

The top shelf 18 has four closed post receiving portions 22. Each post receiving portion 22 secures the top shelf to the top of one of the posts 12. Similarly, each lower shelf 20 is secured to the corner posts 12. Specifically, the posts 12 extend through an open post receiving portion 24 in the region of each of the corners of the lower shelves. The cart may be designed to accept a load of in a range of 150 lbs. (68 kg) to 200 lbs. (90 kg) per shelf and in a range of 300 lbs. (136 kg) to 500 lbs. (227 kg) per cart. In FIG. 1, the lower shelf 20 is located near the bottom of the corner posts, just above the casters. In addition, another lower shelf 20 is fixed or adjustably positioned along the posts 12 between top shelf 18 and the other lower shelf 20.

Figure 2:
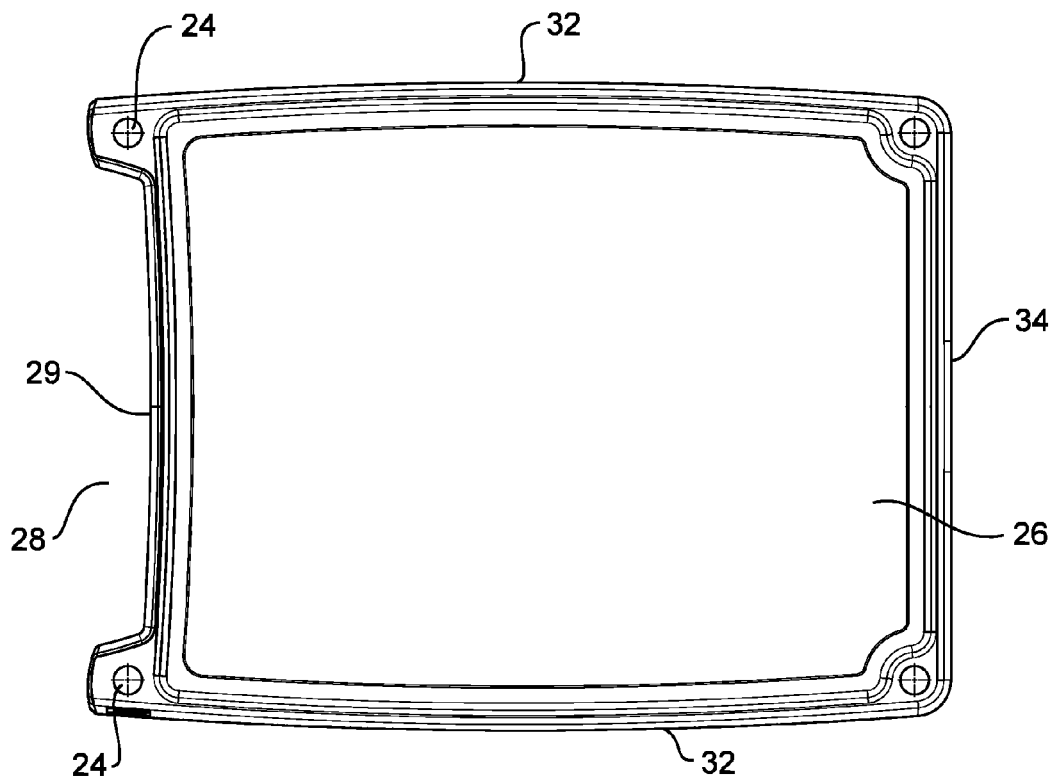
FIG. 2 is a top view of a utility cart shelf for use as a middle or bottom shelf according to one embodiment of the present invention.
Figure 3:
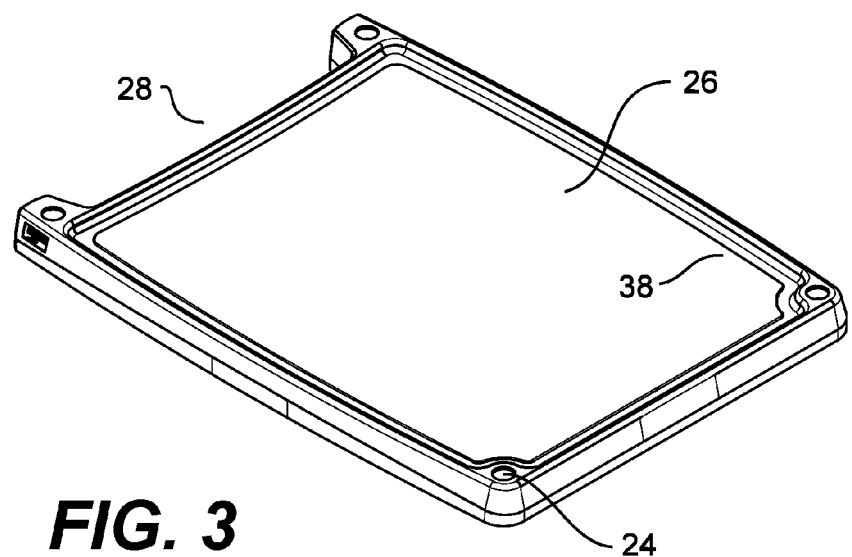
FIG. 3 is a perspective top view of a utility cart shelf for use as a middle or bottom shelf according to one embodiment of the invention.
Figure 4:
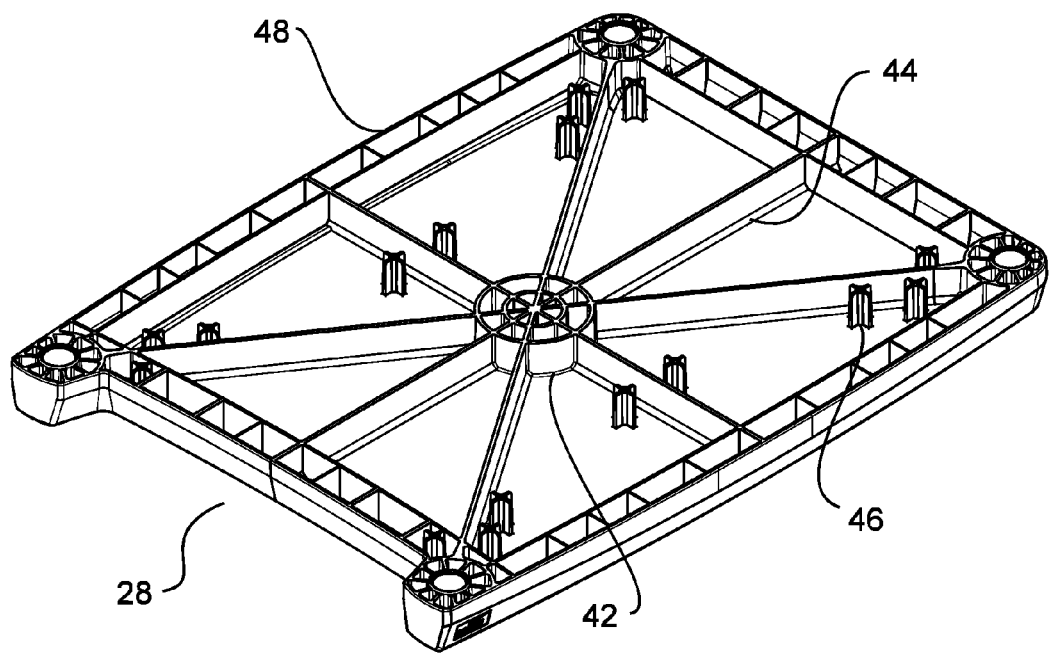
FIG. 4 is a perspective bottom view of a utility cart shelf for use as a middle or bottom shelf according to one embodiment of the invention.

As shown in FIGS. 2-4, the lower shelves 20 include a top surface or deck 26 for carrying articles. The top surface 26 may include a depression in the interior of the surface or a raised lip around the periphery of the surface, in order to retain articles carried on the cart. The shelves include a leading edge 34, a trailing edge 36, and side edges 32. At least a portion (preferably most, and most preferably all) of each of the leading edge 34 and side edges 32 of the cart are positioned exterior to a line connecting corresponding corner posts, in order to maximize the surface area of the cart 10. Preferably, the leading edge 34 and side edges 32 of the cart are positioned exterior to a line that extends between center vertical axes of the post, and most preferably the leading edge 34 and side edges 32 of the cart are positioned exterior to a line between the most exterior dimensions of the corresponding posts.

The trailing edge, or push side edge, however, is formed with a recess 28. Recess 28 preferably extends along a majority of the trailing edge of the cart. Recess 28 is provided only on the push side edge of the lower shelves 20. Recess 28 is defined by an interior edge 29, which forms a portion of the trailing edge of the lower shelf. Preferably, at least a portion (more preferably most, and most preferably all) of the interior edge 29 of the recess 28 extends interior to a line connecting interior edges of posts 12 positioned proximate to the trailing edge 36. Most preferably, the line connects interior walls of the rear open post receiving portions 24. However, the line may extend between the centers of the posts. The recess lessens impediments to the user is walking behind the cart.

Each lower shelf 20 is preferably in a range of about 16 and about 28 inches wide. Each lower shelf 20 is preferably in a range of about 26 and about 42 inches long. Each lower shelf 20 is preferably rectangular in shape, with rounded corners. The shelves may each have a lip edge 38 on top side of shelf. The lip edge 38 may extend fully around the perimeter of each shelf and may be adapted to safely contain commonly used racks and containers. Lip edge 38 defines a depressed section of top surface 26.

The bottom side of the lower shelves 18, as shown in FIG. 4, may include a plurality of at least partially concentric cylindrical projections 42 near the center of the shelf surface, and may include a plurality of radial support ribs 44, each of which runs substantially perpendicular from the sides of the cart or diagonally relative to the sides of the cart. A ladder-shaped support structure 48 may also be included along the periphery of the cart surface in order to provide additional structural support and stability. Cross-shaped attachment projections 46 may also be included in order to allow for optional equipment to be attachable to the utility carts. The bottom side of the lower shelves 18 may also include a wagon wheel structure 80, in each corner of the cart, to help secure corner posts 12 in place. The wagon wheel structure 80 is described in more detail with respect to FIGS. 8 and 9.

Figure 5:
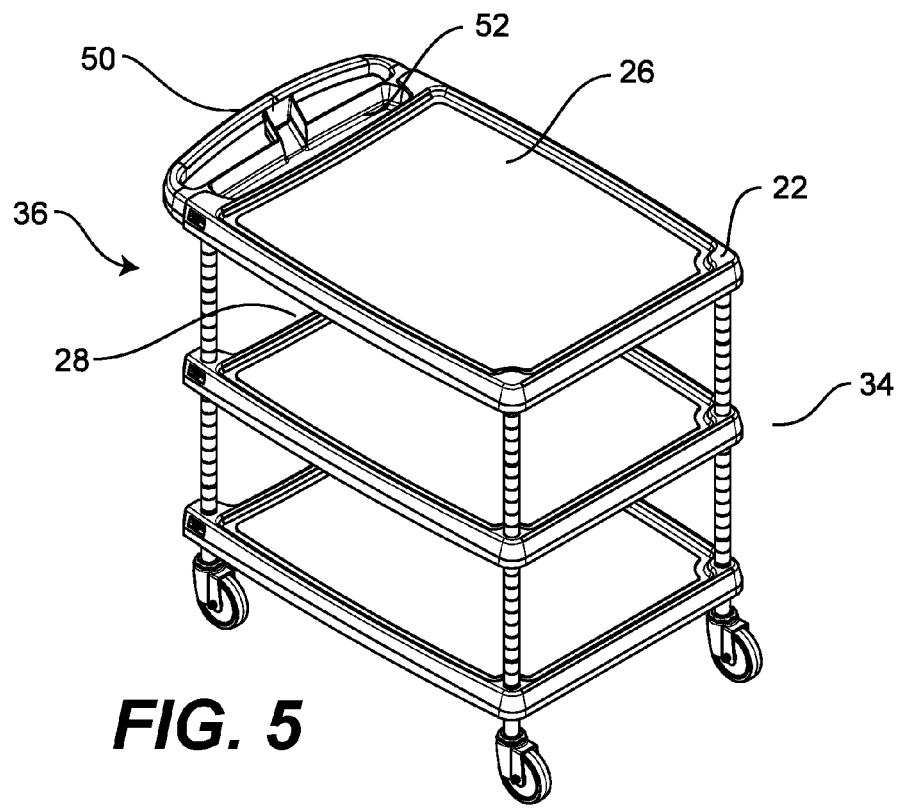
FIG. 5 is a perspective view of a front of an ergonomic utility cart according to one embodiment of the present invention.

As shown in FIG. 5, the leading edge of each of the lower shelves and the top shelf will look aesthetically similar, with the exception of the closed post receiving portions 22 on the top shelf 18. The closed post receiving portions 22 on the top shelf 18 are at the same relative positions as the open post receiving portion 24 in the region of each of the corners of the lower shelves 20 (at least with respect to their common features). The closed post receiving portions 22 sit on the top of the four corner posts 12, while the corner posts 12 pass through the open post receiving portion 24 in the lower shelves 20. The surface 26 on each of the top and lower shelves is the same size and same relative position (at least with respect to their common features). The trailing edges 36 of the lower shelves 20, however, are different than the trailing edge of the top shelf 18. While the trailing edges 36 of the lower shelves 20 include a recess 28, the trailing edge 36 of the top shelf 18 includes a handle 50.

Figure 6:
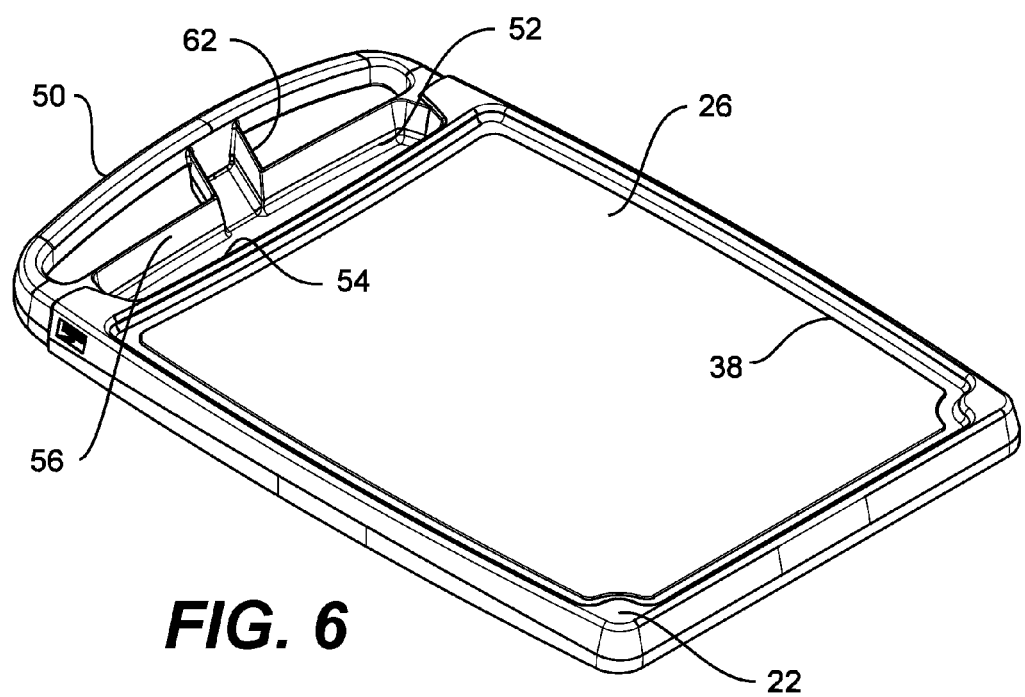
FIG. 6 is a perspective top view of a utility cart shelf for use as a top shelf according to one embodiment of the invention.

As shown in FIGS. 5 and 6, the trailing edge of the top shelf 18 includes a utility tray 52, in the same relative location as a recess 28 in a lower shelf 20. The utility tray 52 includes an interior wall 54 that is located in the same position of the interior edge 29 of the recess 28. The utility tray 52 also includes an exterior wall 56. The top shelf 18 may be formed with a handle 50 at one end. In an alternative embodiment, a handle may be formed at both ends of the cart.

The utility tray 52 is preferably in a range of about 1.5 to about 3.50 inches wide, most preferably in a range of about 2 to 2.5 inches wide, and in a range of about 18 and about 26 inches long (these dimensions may also define the recess in the trailing edge of the lower shelves). The exact width of the utility tray may vary along the length of the utility tray 52. The utility tray 52 depression be tapered to be narrower, in a horizontal direction, at the side walls (near each of the rear corner posts of the cart) and be widest at the center of the utility tray, in order to provide for taper locks on cups and the like placed in the utility tray 52. The utility tray 52 depression may also taper in the vertical direction, in order to provide taper locks. That is, the trailing exterior wall 56 of the utility tray 52 may belly out at the center, away from a line connecting the rear cart posts 12.

The handle 50 may be arched above the top surface of the top shelf arched to allow for multiple hand positions. The arch peaks at the center of the handle and slopes to each side at an angle. A flatter hand position, relative to a horizontal axis, is located in the center of the handle 50. The hand position will rotate away from the horizontal axis and become more angular proximate to the side edges 32 of the cart, which are attached to the edges of the handle 50. The handle is also arched from the trailing edge 36 of the cart towards the leading edge 34 of the cart, such that the rearmost position of the handle is the middle of the handle.

The handle 50 and the utility tray 52 may be connected by a handle supporting structure 62. The handle support structure 62, running between the handle 50 and the utility tray 52 to provide additional stability in the handle, may have a U-shaped cross-section in the direction of extension form the handle to the utility tray 52. Preferably, the U-shape opens upward and defines a storage space in fluid communication with the utility tray. The support structure 62 may be separated from the utility tray 52 by the exterior edge 56 of the utility tray, and or include an opening, as discussed with respect to FIG. 11. That opening may serve as a holder for a scanner or other tools.

Figure 7:
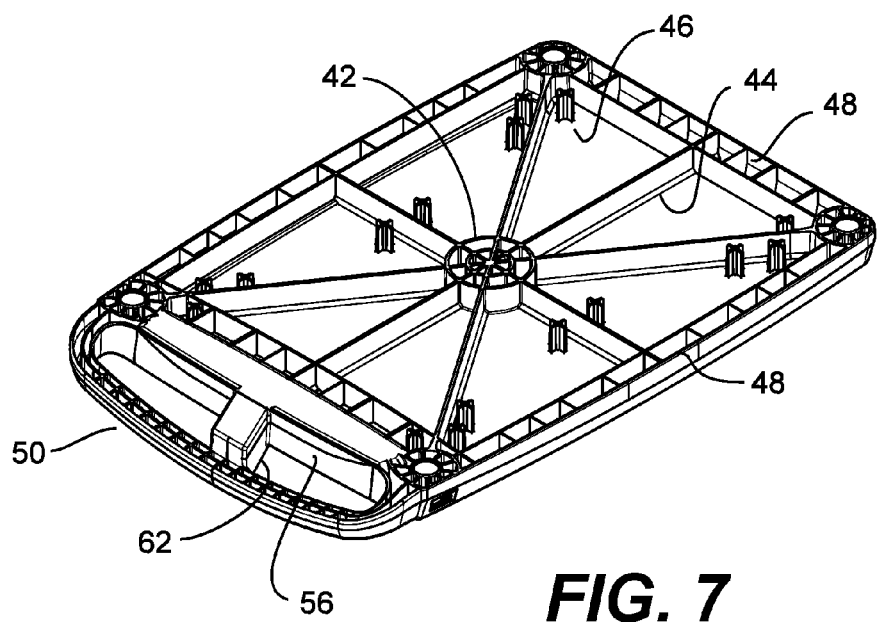
FIG. 7 is a perspective bottom view of a utility cart shelf for use as a top shelf according to one embodiment of the invention.

As shown in FIG. 7, the bottom side of top shelf 18 will substantially the same as the bottom side of the lower shelves 20 shown in FIG. 4, because both shelves are made from the same mold. Accordingly the features thereof will not be repeated. In addition, a wagon wheel structure 80 may be provided in each corner of the cart, to secure each corner posts 12 in place. The wagon wheel structure 80 in the rear of top shelf 18 may be slightly altered (relative to that of a lower shelf) due to the existence of the utility tray where the recess would exist in the lower shelves. That is, the wagon wheel structure 80 in the rear of top shelf 18 will be connected to the side walls of the utility tray 52, rather than including separate walls which define the sides of the recess 28 in the lower shelves 20.

Figure 8:
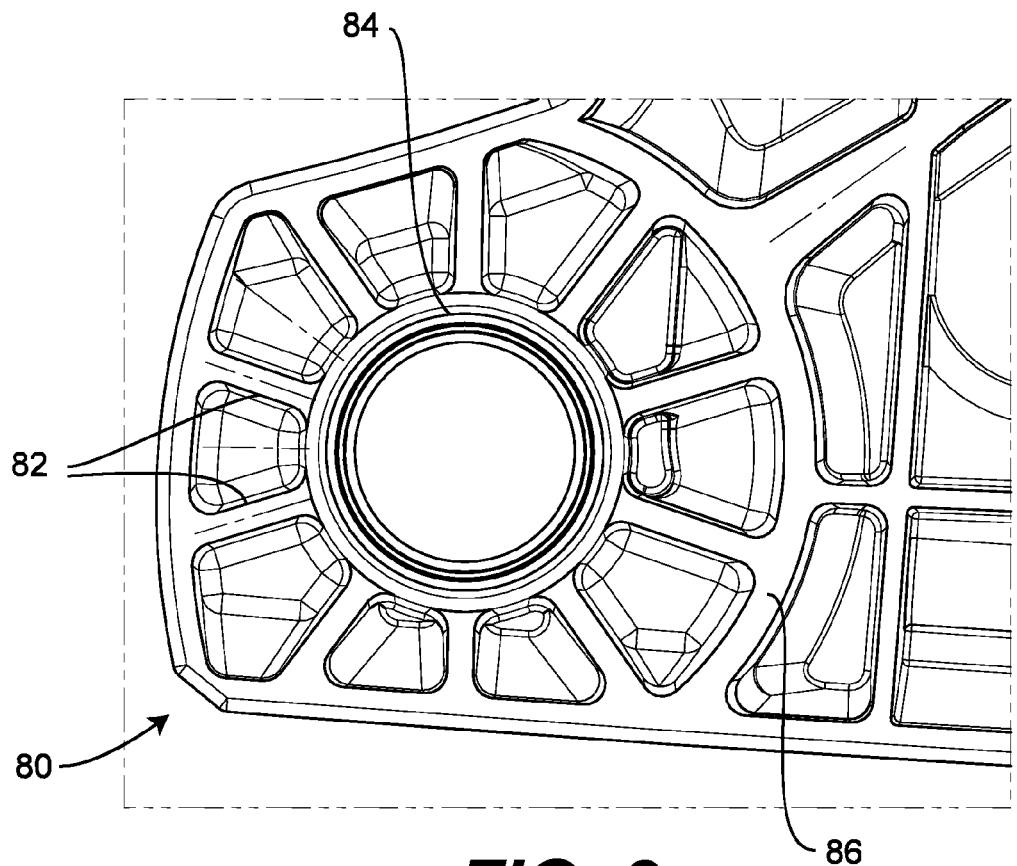
FIG. 8 is a view of a wagon wheel structure on the bottom rear of a utility cart shelf according to one embodiment of the present invention.
Figure 9:
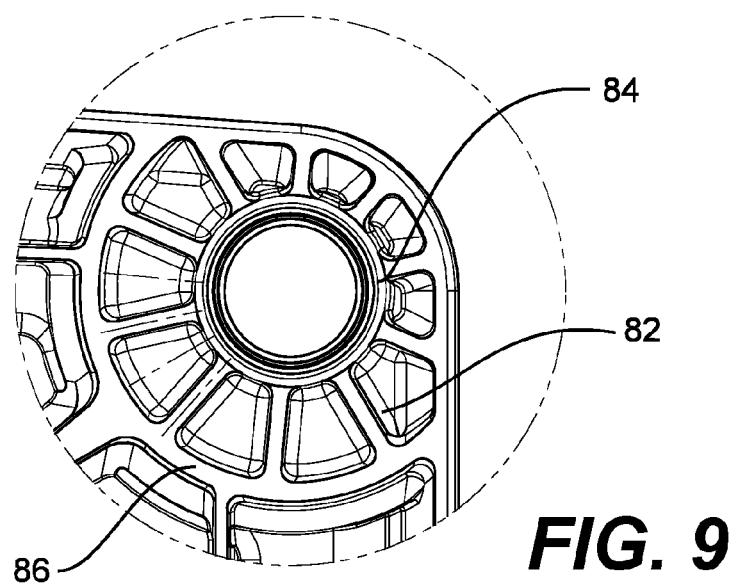
FIG. 9 is a view of a wagon wheel structure on the bottom front of a utility cart shelf according to one embodiment of the invention.

The wagon wheel structure 80, as shown in FIGS. 8 and 9, is defined by interior and exterior concentric circles and a plurality of lines 82 which extend radially from a whole for receiving a corner post. FIG. 8 is a view of a wagon wheel structure on the bottom rear of a utility cart shelf, which has a squared off edge and an interior edge to create a recess. FIG. 9 is a view of a wagon wheel structure on the front of a utility cart shelf, which has rounded front and side edges.

The concentric circles include an inner cylindrical projection 84 which defines a space for receiving a corner post 12 and an outer cylindrical projection 86, which is at least partially concentric with the inner cylindrical projection 84, defines the outer boundary of the wagon wheel structure 80. The inner cylindrical projection 84 preferably has a radius of in a range of about 0.325 and about 0.75 inches, and most preferably has a radius of in a range of about 0.45 and about 0.55 inches. The outer cylindrical projection 86 may be at least partially concentric with the inner cylindrical projection 84 on the interior side of the cart, but be cut off around the exterior edges of the cart, in order to create a more aesthetically pleasing top surface or exterior surface. The outer cylindrical projection 86 preferably has a radius of in a range of about 1 and about 2 inches, and most preferably has a radius in a range of about 1.25 inches. In between these cylindrical projections and raised radial support ribs, the wagon wheel structure defines a plurality of trapezoidal recesses, and other quadrilateral recesses, each with smaller side closer to the whole for corner post.

Figure 10:
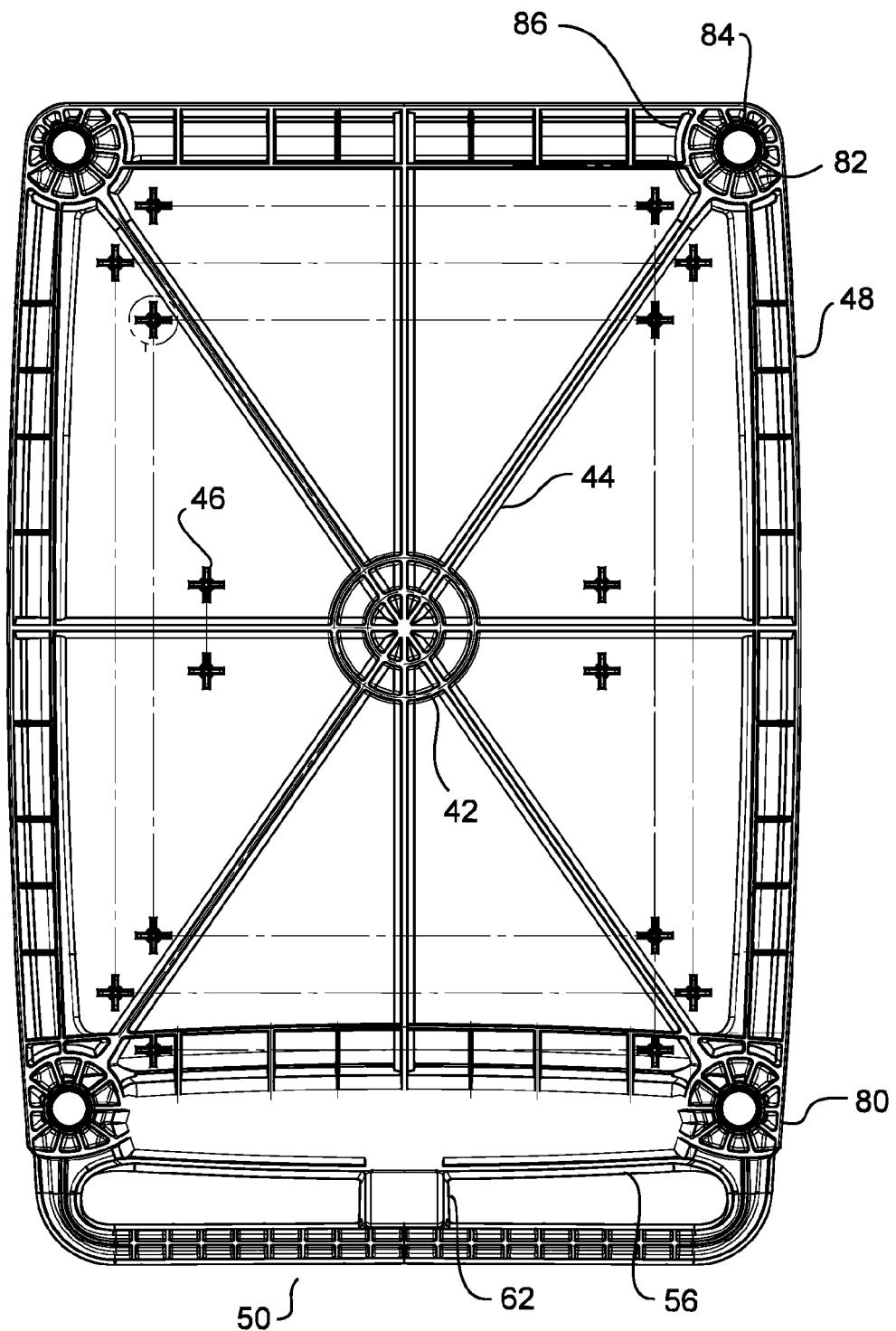
FIG. 10 is a bottom view of a utility cart shelf for use as a top shelf according to one embodiment of the present invention.

The radial support ribs 82 may be placed at a set interval, preferably at about every 36° to create ten evenly spaced quadrilaterals. The quadrilaterals should be spaced the same distance apart, preferably about ⅛ of an inch apart. Each of the trapezoids may have rounded corners, and some of the rounded quadrilaterals corners near the edges of the cart will create a five-sided polygon. As shown in FIG. 10, the radial support ribs 82 of the wagon wheel structure 80 will connect to the side of the utility tray in the top shelf.

Figure 11A:
FIGS. 11A-C are views of different handle support structures for a top shelf according to one embodiment of the present invention.
Figure 11B:
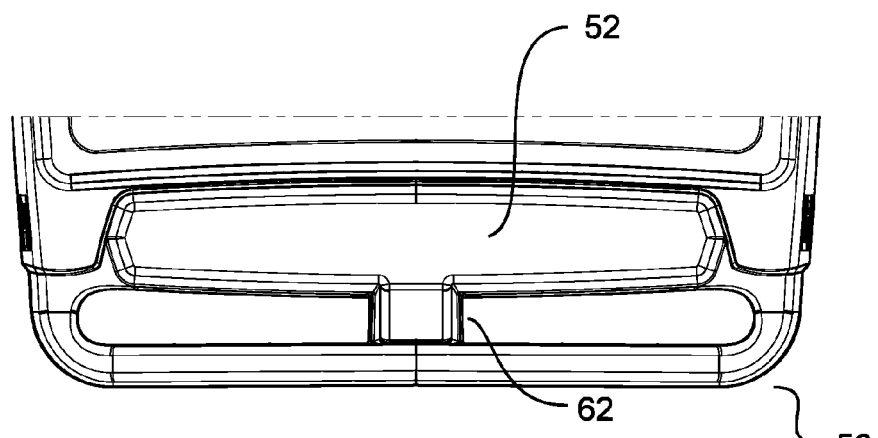
Figure 11C:
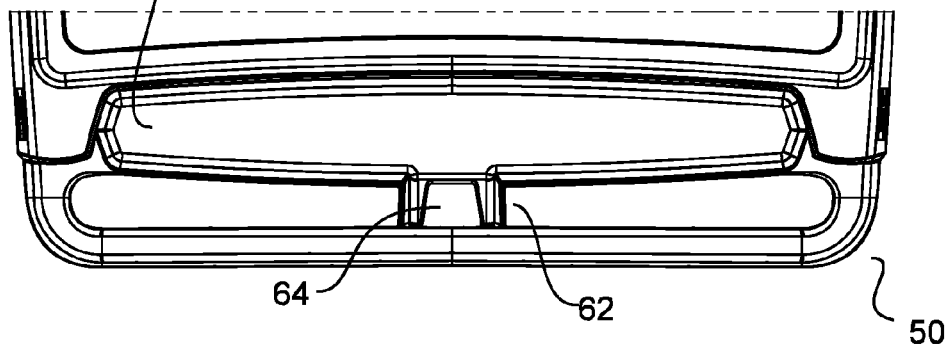

FIGS. 11A-C are views of different handles 50 and handle support structures 62 for use with a top shelf 18. As shown in FIG. 11A, the handle 50 may be provided with no handle supporting structure running between the handle 50 and the utility tray 52. As shown in FIG. 11B, to provide additional stability in the handle, a handle support structure 62 with an upward facing U-shaped structure may be provided in fluid communication with the utility tray 52, increasing the usable surface of the utility tray. As shown in FIG. 11C, the handle support structure 62 may be closed off from the utility tray 52. In addition, the handle support structure 62 may include an opening 64 that may serve as a holder for a scanner or other tools.

With the utility cart of the present invention, there are notable advantages over other modular utility carts known in the art. The cart of the invention incorporates improved ergonomic structures for both top and lower shelves as well as improved stability in the post retaining portions of the cart shelves. The cart reduces the probability of user injury while maintaining utility through large and strong surface areas.

While various example embodiments of the invention have been described in detail above, it should be understood that they have been presented by way of example for purposes of illustration, and not limitation. It is apparent to persons skilled in the relevant art(s) that various changes in form and detail can be made therein. Modification may be made to the preferred embodiments of the ergonomic utility cart described above without departing from the scope of the present invention. Thus, the disclosure should not be limited by any of the above described example embodiments.

The invention claimed is:

1. A cart comprising:
   four corner posts supporting a plurality of shelves that extend substantially perpendicular thereto;
   a plurality of casters supporting the cart;
   an upper shelf, of the plurality of shelves, supported by the four corner posts and comprising four edges, including two side edges, a leading edge and a trailing edge, wherein each of the four edges of the upper shelf is positioned external to a line extending between center axes of a corresponding pair of the four corner posts, and wherein the upper shelf further comprises a handle on the trailing edge of the upper shelf; and
   a lower shelf, of the plurality of shelves, supported by the four corner posts and comprising four edges, including two side edges, a leading edge, and a trailing edge, wherein (i) each of the side edges and the leading edge of the lower shelf is positioned external to a line extending between the center axes of a corresponding pair of the four corner posts when viewed in a direction parallel to the center axes of the corresponding pair of corner posts, and (ii) the trailing edge of the lower shelf defines a recess devoid of material and extending internal to a line extending between the center axes of a corresponding pair of the four corner posts when viewed in the direction parallel to the center axes of the corresponding pair of corner posts.

2. The cart of claim 1, wherein a portion of the trailing edge defining the recess extends interior to a line between internal edges of the corresponding pair of the four corner posts.

3. The cart of claim 1, wherein each shelf, of the plurality of shelves, other than the upper shelf, is supported by the four corner posts and comprises four edges, including two side edges, a leading edge, and a trailing edge, wherein (i) each of the side edges and the leading edge of each shelf is positioned external to a line extending between the center axes of a corresponding pair of the four corner posts when viewed in a direction parallel to the center axes of the pair of corner posts, and (ii) the trailing edge defines a recess, devoid of material and extending internal to a line extending between the center axes of the corresponding pair of the four corner posts when viewed in the direction parallel to the center axes of the pair of corner posts.

4. The cart of claim 1, wherein the handle extends along substantially the entire length of the trailing edge.

5. The cart of claim 1, wherein (i) a tray is formed as a depression in the upper surface of the upper shelf, (ii) the tray is defined by side walls including a trailing side wall positioned farthest from a center of the tray and a leading side wall positioned nearest to the center of the tray, and (iii) the leading side wall is positioned internal to the line extending between the center axes of the pair of the four corner posts corresponding to the recess.

6. The cart of claim 5, wherein the leading side wall of the tray is vertically aligned with the trailing edge of the lower shelf defining the recess.

7. The cart of claim 1, wherein a caster of the plurality of casters is positioned at the bottom of each of the corner posts.

8. The cart of claim 1, wherein each of the upper and the lower shelves have a lip edge, defining a depressed section in the top surface of each of the shelves as a storage surface, extending around the perimeter of the top surface of each shelf.

9. The cart of claim 1, wherein (i) the lower shelf has four open post receiving portions, which are each substantially cylindrical in shape with openings at both sides of the substantial cylindrical shape, for securing the lower shelf to corresponding corner posts, and (ii) the upper shelf has four closed post receiving portions, which are each substantially cylindrical in shape, with a closed top surface for receiving and stopping a corresponding corner post.

10. The cart of claim 1, wherein each of the upper shelf and the lower shelf further comprises a wagon wheel structure surrounding each of the four corner posts, the wagon wheel structure including (i) a substantially cylindrical interior protrusion extending from a bottom of the shelf surface, the interior of which defines a hole for receiving a post, (ii) an exterior protrusion extending from the bottom of the shelf surface which is at least partially concentric with the interior protrusion and surrounds the interior protrusion, and (iii) a plurality of radial ribs, which are formed on the bottom of the shelf surface, extending radially out from the interior protrusion and connecting the interior protrusion and the exterior protrusion.

11. A mobile cart comprising:
    four corner posts extending through and supporting a plurality of shelves, each of the plurality of shelves extending substantially perpendicular to center axes of the corner posts;
    a plurality of casters supporting the cart;
    an upper shelf, of the plurality of shelves, supported by the four corner posts and comprising four edges, including two side edges, a leading edge and a trailing edge, wherein a concave tray is formed in a top surface of the upper shelf, the tray being defined by a plurality of walls including a leading wall positioned on a side of the tray closest to the center of the upper shelf, wherein the upper shelf further comprises a handle on the trailing edge; and
    a lower shelf, of the plurality of shelves, supported by the four corner posts and comprising four edges, including two side edges, a leading edge, and a trailing edge, wherein (i) each of the side edges and the leading edge of the lower shelf is positioned external to a line extending between the center axes of a corresponding pair of the four corner posts when viewed in a direction parallel to the center axes of the pair of corner posts, (ii) the trailing edge defines a recess devoid of material and extending internal to a line extending between the center axes of a corresponding pair of the four corner posts when viewed in the direction parallel to the center axes of the pair of corner posts, and (iii) in directions perpendicular to the four corner posts, the trailing edge defining the recess and the leading wall of the tray are in the same relative positions.

12. The cart of claim 11, wherein a portion of the trailing edge defining the recess extends interior to a line between internal edges of the corresponding pair of the four corner posts.

13. The cart of claim 11, wherein the upper shelf further comprises the handle on the trailing edge of the cart that extends along substantially the entire length of the trailing edge.

14. The cart of claim 11, wherein (i) the tray is defined by side walls including the leading side wall positioned closest to the center of the tray and a trailing side wall positioned farthest from a center of the tray, (ii) the trailing side wall is positioned external to a line extending between center axes of a pair of the four corner posts positioned proximate the trailing edge of the upper shelf, and (iii) the leading side wall is positioned internal to a line extending between the center axes of the pair of the four corner posts positioned proximate to the trailing edge of the upper shelf.

15. The cart of claim 11, wherein the leading side wall of the tray is vertically aligned with the recess of the trailing edge of the lower shelf.

16. The cart of claim 11, wherein (i) the lower shelf has four open post receiving portions, which are each substantially cylindrical in shape with openings at both sides of the each substantial cylindrical shape, for securing the lower shelf to corresponding corner posts and (ii) the upper shelf has four closed post receiving portions, which are each substantially cylindrical in shape, with a closed top surface for receiving and stopping a corresponding corner post.

17. The cart of claim 11, wherein each of the upper shelf and the lower shelf further comprises a wagon wheel structure surrounding each of the four corner posts, the wagon wheel structure including (i) a substantially cylindrical interior protrusion extending from a bottom of the shelf surface, the interior of which defines a hole for receiving a post, (ii) an exterior protrusion extending from the bottom of the shelf surface which is at least partially concentric with the interior protrusion and surrounds the interior protrusion, and (iii) a plurality of radial ribs, which are formed on the bottom of the shelf surface, extending radially out from the interior protrusion and connecting the interior protrusion and the exterior protrusion.

\* \* \* \* \*